(12) United States Patent
Dunlap et al.

(10) Patent No.: US 8,641,079 B2
(45) Date of Patent: Feb. 4, 2014

(54) MULTI-AXLE VEHICLE SUSPENSION SYSTEM

(75) Inventors: William Dunlap, Elkhart, IN (US); Ronnie L. Tharp, Goshen, IN (US)

(73) Assignee: Dexter Axle Company, Elkhart, IN (US)

( * ) Notice: Subject to any disclaimer, the term of this patent is extended or adjusted under 35 U.S.C. 154(b) by 16 days.

(21) Appl. No.: 13/314,283

(22) Filed: Dec. 8, 2011

(65) Prior Publication Data

US 2013/0147146 A1     Jun. 13, 2013

(51) Int. Cl.
  *B60G 5/00*   (2006.01)
  *B60G 5/04*   (2006.01)

(52) U.S. Cl.
  USPC .............. 280/684; 280/124.166; 280/676; 280/682

(58) Field of Classification Search
  USPC .............. 280/676, 679, 682, 684, 124.116, 280/124.166, 124.169
  See application file for complete search history.

(56) References Cited

U.S. PATENT DOCUMENTS

| | | | | |
|---|---|---|---|---|
| 1,933,675 A | * | 11/1933 | Marcum | 180/24.11 |
| 2,719,728 A | | 10/1955 | Boyles | |
| 2,795,434 A | | 6/1957 | Gouirand | |
| 2,869,889 A | | 1/1959 | Dickison | |
| 3,171,668 A | * | 3/1965 | Willetts | 280/684 |
| 3,397,896 A | * | 8/1968 | Willetts | 280/677 |
| 3,504,929 A | | 4/1970 | King | |
| 3,533,641 A | * | 10/1970 | Driskill | 280/43.18 |
| 3,547,461 A | * | 12/1970 | Sheridan | 280/681 |
| 3,625,538 A | * | 12/1971 | Raidel | 280/686 |
| 3,856,325 A | | 12/1974 | Willetts | |
| 4,033,606 A | | 7/1977 | Ward et al. | |
| 4,193,612 A | | 3/1980 | Masser | |
| 4,385,857 A | * | 5/1983 | Willetts | 410/53 |
| 4,502,707 A | | 3/1985 | Jable et al. | |
| 4,505,459 A | | 3/1985 | Goth et al. | |
| 4,763,921 A | | 8/1988 | Steiner | |
| 4,824,138 A | | 4/1989 | Rappold | |
| 5,186,485 A | | 2/1993 | Orr et al. | |
| 5,505,482 A | * | 4/1996 | VanDenberg | 280/86.5 |
| 5,788,263 A | * | 8/1998 | VanDenberg | 280/124.116 |
| 5,820,156 A | * | 10/1998 | VanDenberg | 280/676 |
| 6,340,165 B1 | | 1/2002 | Kelderman | |
| 6,382,659 B1 | | 5/2002 | Simard | |
| 6,478,321 B1 | | 11/2002 | Heitzmann | |
| 6,604,756 B2 | | 8/2003 | Simard et al. | |
| 7,753,400 B2 | | 7/2010 | Dunlap et al. | |
| 7,950,678 B1 | * | 5/2011 | Bauder | 280/43.18 |
| 7,980,577 B2 | * | 7/2011 | Vandenberg et al. | 280/124.128 |
| 8,191,911 B1 | * | 6/2012 | Reynolds | 280/124.166 |
| 2005/0151339 A1 | * | 7/2005 | Carty | 280/124.169 |
| 2007/0063488 A1 | * | 3/2007 | Dunlap et al. | 280/682 |

FOREIGN PATENT DOCUMENTS

| | | |
|---|---|---|
| EP | 0114992 | 8/1984 |
| EP | 0149262 | 11/1988 |
| GB | 1591914 | 7/1981 |
| WO | 2004037568 A2 | 5/2004 |

\* cited by examiner

*Primary Examiner* — James English

(74) *Attorney, Agent, or Firm* — Ryan M. Fountain

(57) ABSTRACT

A multi-axle vehicle suspension system comprising a first torsion axle mounted to a first suspension pivot member, the first suspension pivot member pivotally coupled to a vehicle frame, a second torsion axle mounted to a second suspension pivot member, the second suspension pivot member pivotally coupled to the vehicle frame, a pivot member pivotally coupled to the vehicle frame, the first suspension pivot member pivotally coupled to the pivot member, and the second suspension pivot member pivotally coupled to the pivot member.

3 Claims, 3 Drawing Sheets

MULTI-AXLE VEHICLE SUSPENSION SYSTEM

FIELD OF THE INVENTION

The invention relates to a multi-axle vehicle suspension system, and more particularly to a multi-axle vehicle suspension system having at least two torsion axles, each torsion axle coupled to a vehicle frame, and further having a pivotal member pivotally coupled to the vehicle frame and pivotally coupled to each torsion axle.

BACKGROUND OF THE INVENTION

Conventional multi-axle assemblies for trucks or trailers may comprise two or more axles. In the case of a two axle arrangement, four leaf springs are typically used. Two leaf springs are on each side of the frame. The remote ends of each pair of springs are usually supported within hanger brackets which are secured to the frame. The adjacent ends of each pair of springs can be supported by a pivotally mounted equalizer. The equalizers are in turn supported by hanger brackets which are secured to the frame.

When the front wheels in the tandem suspension, for example, encounter a condition in the road producing a vertical movement of the front axle, the resultant deflection in the front springs is transmitted in part by the equalizer to the rear springs. This results in an equalizing effect in which any vertical displacement of either axle is distributed between the springs which minimizes the weight differential between the axles.

In the instance of a vehicle equipped with a prior art equalization tandem one problem concerns inadequate and abrupt load equalization from one axle to another. As one end of the equalizer rotates upwardly at the point at which the spring end contacts the leaf spring, the other end abruptly rotates downward. This action causes abrupt and unequal moments about the center pivot point of the equalizer; inequality increases as the range of equalizer movement increases.

The end results of improper load equalization are numerous. If the axle which encounters bumps and overloads is unpowered, a loss of traction can occur on the powered axle. The suspension components, and springs in particular, are subjected to higher stresses and therefore their service life is shortened appreciably. As the leaf springs are subjected to overload they progressively lose capacity to absorb energy and therefore transmit more energy through the mounting brackets to the vehicle frame. Increased input of energy into the vehicle frame can often contribute at given loads, speeds and highway conditions to damage to the vehicle. Further, wherever an unequal load distribution occurs within a tandem suspension, the axle which is overloaded transmits its load to the roadway in a manner that can be detrimental to the roadway. The foregoing arguments also apply to suspensions comprising more than two axles.

Torsion axles have been known for many years. Torsion axles have proven to be extremely popular primarily because if one wheel hits a bump or rut, it can react independently of the other wheel, which may not have hit a bump or rut at the exact same time. This torsion axle concept therefore operates to keep a trailer or the like moving as straight as possible behind a towing vehicle and absorbs some of the shock of the road over which it is passing with an independent suspension. This can be contrasted with a straight axle situation where if one wheel were to drop into a rut or the like and be slowed down for that reason while the wheel on the other side of the trailer did not have the same experience at the same time, the trailer would tend to turn somewhat to allow the wheel that is on the flat part of the road to move forward while the wheel that is in the rut would be restrained, therefore causing the axle to be not perpendicular with the direction of towing of the vehicle itself, assuming in this example that the trailer was being towed on a straight portion of the road.

The two aforementioned torsion axles are typically constructed of a square axle in cross section with elongated rubber members all disposed within a larger tube. One of the most common and popular torsion axles is a TorFlex® rubber torsion suspension system by Dexter Axle Company. This mentioned torsion axle has independent and separate stub axles on each side to enhance the independent aspect of such an axle.

Representative of the art is U.S. Pat. No. 6,340,165 which discloses a vehicle suspension system assembly for attachment to a vehicle frame having a torsion axle and at least two ground engaging wheels operatively rotatably attached to each respective end of the torsion axle has an attachment member which is adapted to be attached to the frame. An arm is operably pivotally attached to the attachment member along an axis. A torsion axle is received in a torsion axle receiving portion of the assembly at a first distance spaced from the aforementioned axis for selectively receiving the torsion axle. An air bag is operatively disposed between the frame and the arm, the air bag being spaced at a second distance from the axis. A linkage element of variable length, which can be a shock absorber, is operably attached to the frame and to the arm whereby the arm will be held at a predetermined position with respect to the frame and yet allow the arm to pivot about the axis. In a preferred embodiment, the air bag is spaced further away from the pivotal axis of the arm than is the torsion axle.

Further representative of the art is U.S. Pat. No. 7,753,400 which discloses a multi-axle leaf spring suspension having a compliant equalizer. The leaf springs are mounted one behind the other on each side of the vehicle. Adjacent ends of the leaf springs are pivotally attached to the compliant equalizer. The compliant equalizer is pivotally mounted to a vehicle frame. The compliant equalizer comprises a pair of arms that are pivotally connected to each other in a scissor-like fashion. One end of each arm is pivotally connected to the end of a leaf spring. The other end of each arm is cooperatively arranged to contain and compress a spring member between them. The compliant equalizer reduces the magnitude of shocks that would be otherwise transmitted to the suspension and frame by absorbing them through compression of the spring member.

What is needed is a multi-axle vehicle suspension system having at least two torsion axles, each torsion axle coupled to a vehicle frame, and further having a pivotal member pivotally coupled to the vehicle frame and pivotally coupled to each torsion axle. The present invention meets this need.

SUMMARY OF THE INVENTION

The primary aspect of the invention is to provide a multi-axle vehicle suspension system having at least two torsion axles, each torsion axle coupled to a vehicle frame, and further having a pivotal member pivotally coupled to the vehicle frame and pivotally coupled to each torsion axle.

Other aspects of the invention will be pointed out or made obvious by the following description of the invention and the accompanying drawings.

The invention comprises a multi-axle vehicle suspension system comprising a first torsion axle mounted to a first suspension pivot member, the first suspension pivot member pivotally coupled to a vehicle frame, a second torsion axle mounted to a second suspension pivot member, the second suspension pivot member pivotally coupled to the vehicle frame, a pivot member pivotally coupled to the vehicle frame, the first suspension pivot member pivotally coupled to the pivot member, and the second suspension pivot member pivotally coupled to the pivot member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
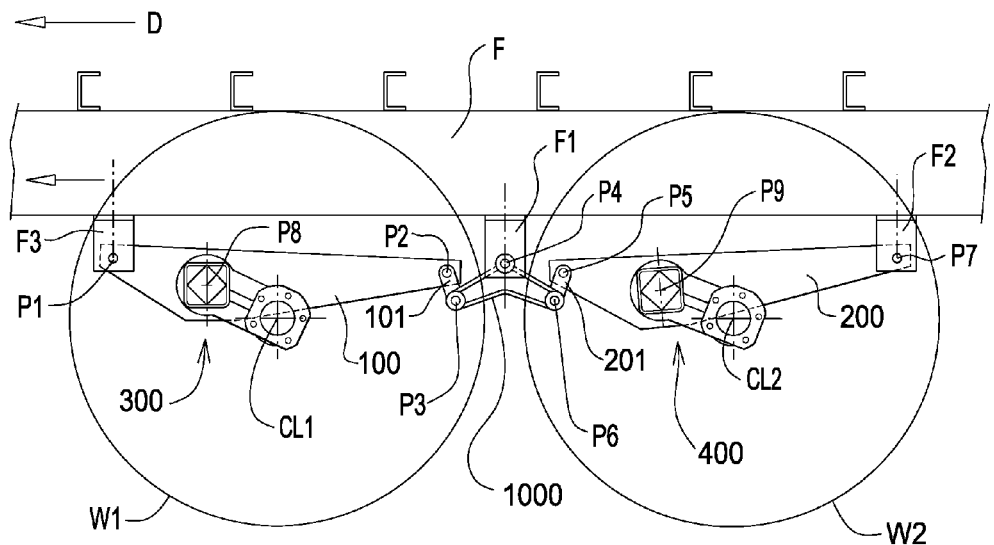
FIG. 1 is a side view of the inventive suspension.

FIG. 1 is a side view of the inventive suspension. The inventive system comprises a multi-axle vehicle suspension system comprising a first torsion axle mounted to a first suspension pivot member, the first suspension pivot member pivotally coupled to a vehicle frame, a second torsion axle mounted to a second suspension pivot member, the second suspension pivot member pivotally coupled to the vehicle frame, a pivot member pivotally coupled to the vehicle frame between the first suspension pivot member and the second suspension pivot member, the first suspension pivot member pivotally coupled to the pivot member, and the second suspension pivot member pivotally coupled to the pivot member.

It is understood that FIG. 1 shows one side of a vehicle suspension, a like arrangement being present on the other side of the vehicle. The theoretical direction of travel for the frame is D.

The vehicle comprises a frame F. Mount F1 and mount F2 and mount F3 are affixed to the frame F. A suspension pivot member 1000 is pivotally coupled to mount F1.

One end of a suspension pivot member 100 is pivotally coupled to mount F3. The other end of the suspension pivot member is pivotally coupled to a coupling member 101. Coupling member 101 is also pivotally coupled to pivot member 1000.

One end of a suspension pivot member 200 is pivotally coupled to mount F2. The other end of the suspension pivot member is pivotally coupled to a coupling member 201. Coupling member 201 is also pivotally coupled to pivot member 1000.

A torsion axle assembly 300 is installed in suspension pivot member 100. Torsion axle assembly 300 is described in FIG. 4. A wheel and tire combination W1 is rotationally mounted to the axle assembly at CL1.

A torsion axle assembly 400 is installed in suspension pivot member 200. Torsion axle assembly 400 is described in FIG. 4. A wheel and tire combination W2 is rotationally mounted to the axle assembly at CL2.

As a vehicle travels on a road the suspension absorbs movement of axles A1 and A2 by movement of each of the suspension pivot members 100 and 200, as well as by the pivoting movement of pivot member 1000. Pivot member 1000 pivots on mount F1 to further absorb and transmit differential movement of the two axle assemblies 300, 400.

Figure 2:
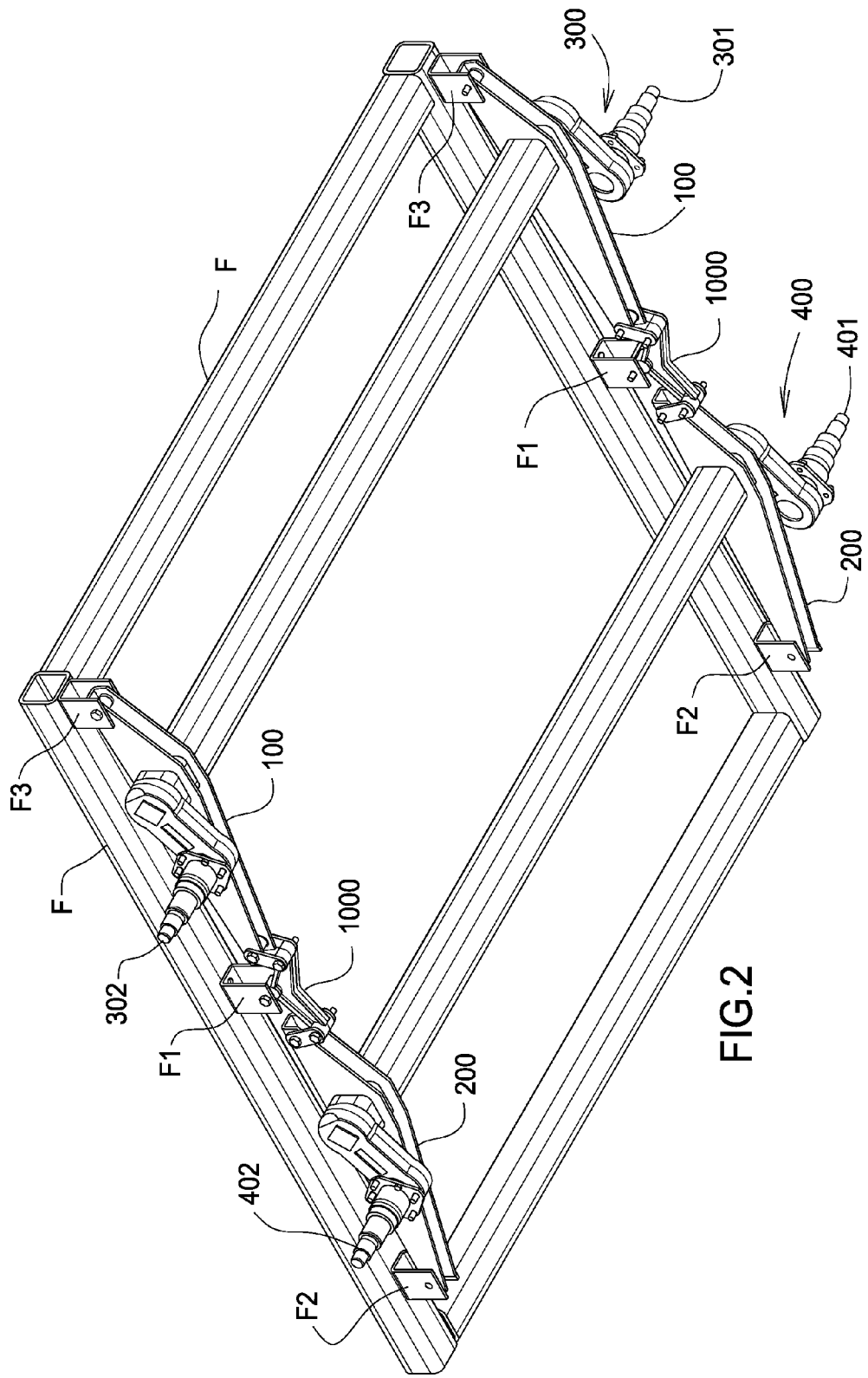
FIG. 2 is a lower perspective view of the inventive suspension system.

FIG. 2 is a lower perspective view of the inventive suspension system. Two torsion axles 300, 400 are shown mounted to suspension pivot members 100, 200, respectively.

Axle 300 comprises a spindle 301 and spindle 302 on opposite sides of the axle. Axle 400 comprises a spindle 401 and spindle 402 on opposite sides of the axle. Wheel W1 is attached to spindle 301. Wheel W2 is attached to spindle 401. A wheel is also attached to each spindle 302 and spindle 402.

Figure 3:
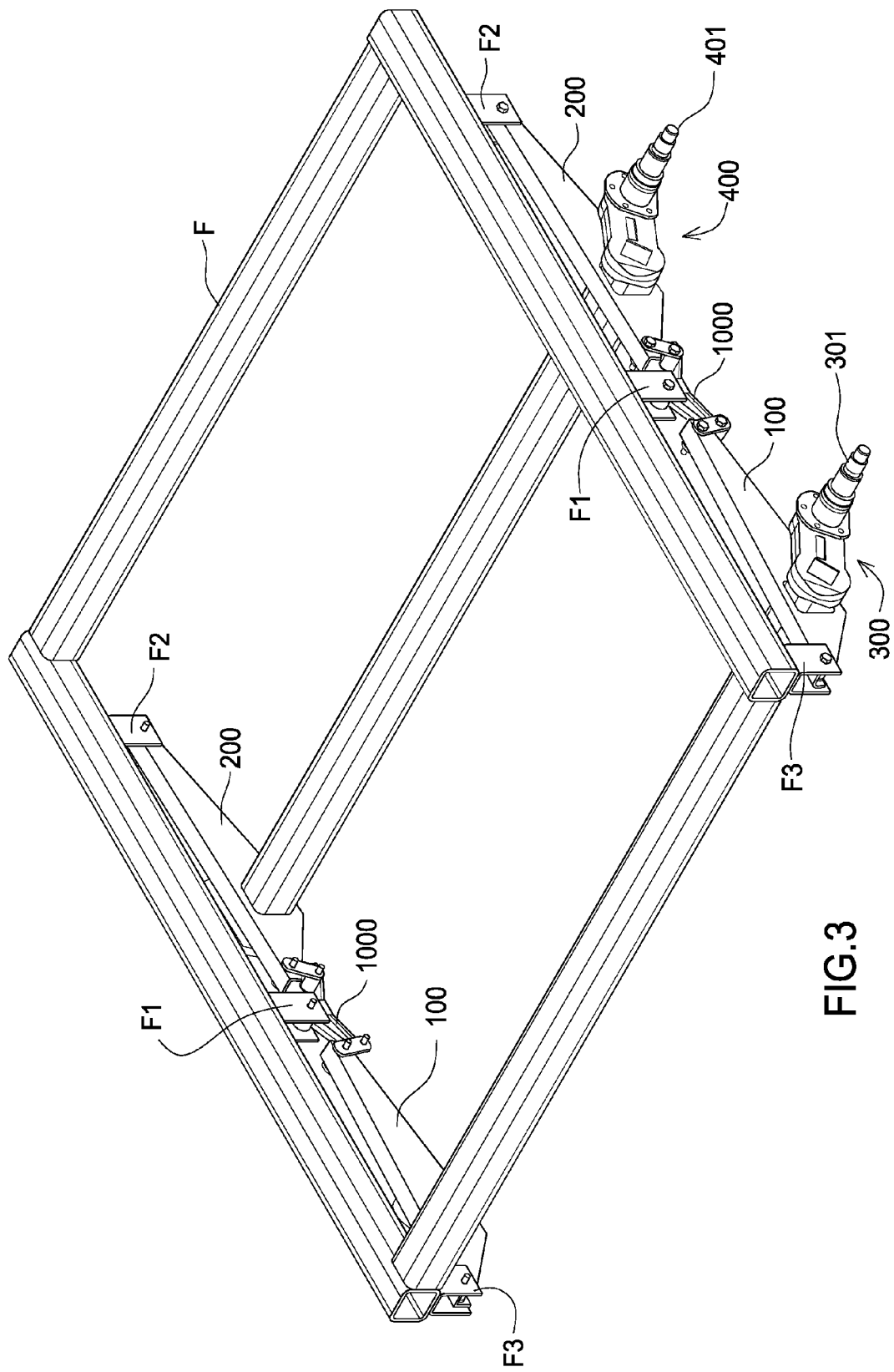
FIG. 3 is an upper view of the inventive suspension system.

FIG. 3 is an upper view of the inventive suspension system. The system enjoys multiple pivot points that are available to absorb movement of the suspension system as the vehicle rolls over a road surface. Suspension pivot member 100 pivots about pivot points P1 and P2. Suspension pivot member 200 pivots about pivot points P7 and P5. Pivot member 1000 pivots about pivot point P4. Coupling member 101 pivots about pivot points P2 and P3. Coupling member 201 pivots about pivot points P5 and P6. Torsional axle assembly 300 pivots about pivot point P8. Torsion axle assembly 400 pivots about pivot point P9.

The geometry of the system can be adjusted by selecting the desired location of each pivot point P8 and P9 along the length of each suspension pivot member 100 and pivot member 200 respectively. Pivot point P8 may be located to one side or the other of the suspension pivot member 100 along its length as shown in FIG. 1, or it may be centered in suspension pivot member 100 as well. Pivot point P9 may be located to one side or the other of the suspension pivot member 200 along its length as shown in FIG. 1, or it may be centered in suspension pivot member 200 as well. Further, pivot points P8 and P9 need not be located in the same relative position on each respective suspension pivot member. In the preferred embodiment each spindle 301 and spindle 401 is approximately centered between each pivot point P1, P2 and P5, P7 respectively.

Each wheel and tire W1 and wheel and tire W2 and the internals of each torsion axle assembly will damp oscillations generated in the system by movement of the vehicle over a road surface and will distribute the vehicle load over the road surface more evenly than a conventional suspension.

Figure 4:
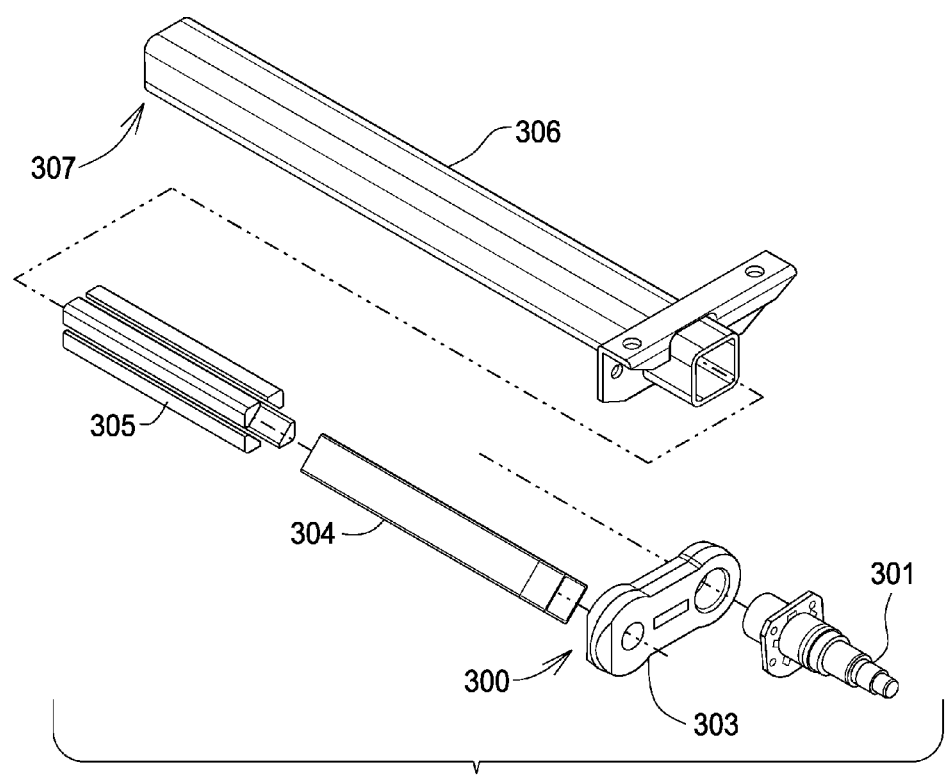
FIG. 4 is a detail of the torsion axle.

FIG. 4 is a detail of the torsion axle. The torsion axle comprises a plurality of rubber cords disposed within an axle member, and a torsion member situated within the axle member by the rubber cords, and finally, the torsion member connected to a spindle for mounting a vehicle tire. Each torsion axle 300 and axle 400 comprises the arrangement described herein for each vehicle tire.

More particularly, spindle 301 is attached to torsion arm 303. Torsion member 304 is attached to torsion arm 303. Torsion member 304 is rectangular or square in cross-section. Torsion member 304 is disposed within an axle member 306 receiving portion 307. Axle member 306 has a rectangular or square cross-section. Also disposed within axle member 306 is a plurality of rubber cords 305. Rubber cords 305 are of a sufficient size and are disposed between the torsion member 304 and axle member 306 in a manner which counters rotational movement of torsion member 304 when a load is applied to the spindle 301. In the preferred embodiment there are four rubber cords 305.

Since the rubber cords are elastic and somewhat compressible, this characteristic allows rotational movement of torsion member 304 which is roughly proportionate to the magnitude of the load applied to the axle spindles. The rotation of each torsion member is typically less than 45°.

Although forms of the invention have been described herein, it will be obvious to those skilled in the art that variations may be made in the construction and relation of parts without departing from the spirit and scope of the invention described herein.

We claim:

1. A multi-axle vehicle suspension system comprising:
   a first torsion axle mounted to a first suspension pivot member, the first suspension pivot member pivotally coupled to a vehicle frame;
   a second torsion axle mounted to a second suspension pivot member, the second suspension pivot member pivotally coupled to the vehicle frame;
   a pivot member pivotally coupled to the vehicle frame;
   the first suspension pivot member pivotally coupled to the pivot member; and
   the second suspension pivot member pivotally coupled to the pivot member.

2. The multi-axle vehicle suspension system as in claim 1, wherein:
   the torsion axle comprises a plurality of rubber cords disposed within an axle member;
   a torsion member cooperatively received within the axle member among the rubber cords; and
   the torsion member connected to a spindle, the spindle for receiving a vehicle tire.

3. The multi-axle vehicle suspension system as in claim 1, wherein, the pivot member is disposed between the first suspension pivot member and the second suspension pivot member.

* * * * *